Figure 1:
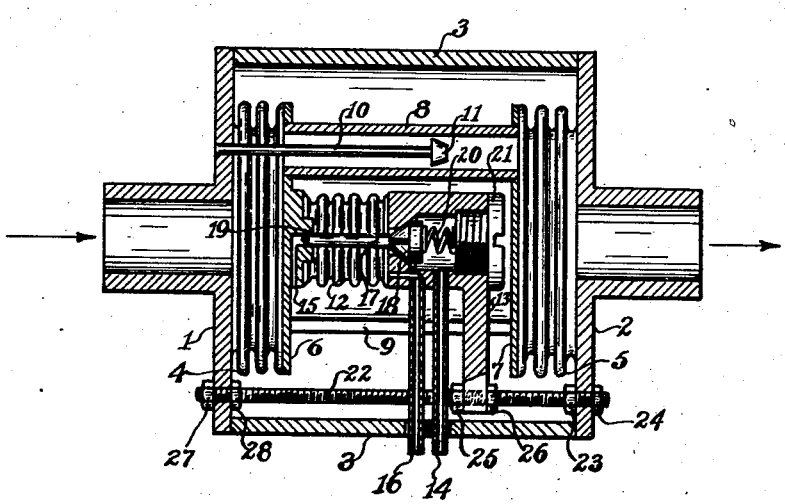

Sept. 14, 1937.  H. A. HOEKSTRA  2,092,844
APPARATUS FOR COUNTERBALANCING A FORCE Filed Nov. 14, 1935

INVENTOR.
HENDRIK ARIUS HOEKSTRA
BY
ATTORNEY.

Patented Sept. 14, 1937

2,092,844

UNITED STATES PATENT OFFICE 2,092,844

APPARATUS FOR COUNTERBALANCING A FORCE

Hendrik Arius Hoekstra, Amsterdam, Netherlands

Application November 14, 1935, Serial No. 49,790
In the Netherlands November 21, 1934

2 Claims. (Cl. 73—205)

The present invention relates to an arrangement, in which a force or a liquid or gas pressure, exerted upon a movable wall of an enclosed space, is counterbalanced by means of a counterbalancing medium.

The object of the invention is to provide an arrangement which ensures a very accurate counterbalancing and due to its simplicity and universal character, opens a wide field of application.

In the German patent specification No. 275,985 an arrangement for automatic counterbalancing of pressure has already been described, in which a pressure or force to be measured acts upon a piston of a liquid or gas filled cylinder; with this piston there are associated a combined admission and exhaust slide valve by means of a system of levers. The pressure of the counterbalancing medium can be measured remotely.

In addition to the large moving masses the drawback of this arrangement is, that practically this complex of slide valves will always have a backlash which may seriously affect the sensitivity of the apparatus.

These difficulties have been overcome in the arrangement according to this invention, or at least have been minimized as much as possible.

In the arrangement according to this invention, the force or pressure to be counterbalanced is exerted upon a movable wall of an enclosed e. g. cylindrical space. This wall may be a diaphragm or piston; other boundaries of this space may also allow the said wall to move for example because they consist of a bellows. The force or pressure is counterbalanced just as in the abovementioned patent specification, by the excess pressure or lack of pressure of the medium within the counterbalancing space to be measured remotely.

In accordance with the main feature of the invention, this automatic adjustment of the counterbalancing is effected by a loose system of valves provided within the counterbalancing space and consisting of two rigidly connected valves which are maintained in the normal position with closed admission and exhaust apertures of this space by the excess pressure or lack of pressure of the counterbalancing medium, the said exhaust opening of which performs a forced movement in unison with the movable wall.

Furthermore the pressure of the counterbalancing medium on the admission valve may be increased by the pressure of a small spring. A still more accurate working of the arrangement can be obtained if in accordance with this invention one or more grooves of very small depth are provided in one of the valves or valve seats, in such a way that the valve leaks very slightly.

The advantages of this arrangement as mentioned above will be clearly understood from the following description of a single embodiment which is of actual importance namely a meter for measuring the velocity of flow of liquid or gaseous substances.

In Fig. 1 of the accompanying drawing the apparatus is shown partly in longitudinal section.

Figure 2:
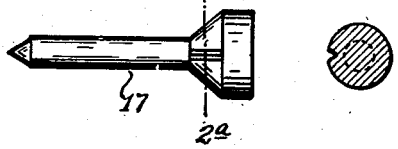
Figure 2A:

Fig. 2 represents the system of valves and Fig. 2a is a section along line 2a—2a of Fig. 2.

Figure 3:
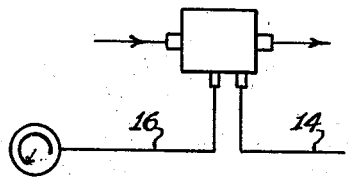

Fig. 3 schematically illustrates the installation of the apparatus.

In Fig. 1 the casing of the apparatus consists of the two covers 1 and 2, which are interconnected by an intermediate member 3 which e. g. may be a tube through which bolts secured by nuts are provided. If desirable the entire structure may be surrounded by a protecting sheath.

Within the covers 1 and 2 there are provided diaphragms 4 and 5 which are represented here by a metal bellows-shaped structure. Another construction of these walls e. g. of fabrics is also imaginable. The bellows are closed by the plates 6 and 7 interconnected by a communicating tube 8 and one or more rods 9.

Within the tube 8 a rod 10 is threaded in the cover 1, the said rod carrying at its free end a throttling member e. g. a conical disc 11 with a sharp edge. The function of this member will be explained below.

When within the admission space (on the left side), communicating tube and exhaust space (right hand side) there is a matter e. g. a liquid in rest, the same pressure per unit surface will be exerted upon both plates. If the active surface of the plates 6 and 7 is equal there will be a state of equilibrium. The apparatus is now insensible to pressure fluctuations in the matter.

If however a flow takes place in the direction of the arrows this flowing matter will encounter a resistance, which mainly depends on the throttling action, caused by the conical disc. The function of the disc 11 is therefore to create a strong throttling action.

The consequence will be, that within the diaphragm 4 (at the admission end) a higher pressure will be exerted than within the diaphragm 5 (at the exhaust end). The resulting force acting on the plate 6, to be called directing force hereafter, therefore is equal to the appearing difference of pressure multiplied by the surface of one of the plates (if both surfaces are equal).

The resistance within the tube 8 and accordingly also the directing force are practically speaking proportional to the square power of the velocity of flow, provided the gap between the disc 11 and the tube 8 remains constant.

The force exerted upon the plate 6 is counterbalanced by the pressure of a counterbalancing medium to be remotely measured in the following manner.

To the plate 6 there is secured a counterbalancing bellows 12 which at the end remote from the admission is connected to the casing of the apparatus e. g. by means of the carrier 13. By making the carrier 13 adjustable with respect to the longitudinal axis of the apparatus, the zero point adjustment, being very important for this apparatus, may be obtained. The carrier 13 may, for example, be slidable along a threaded bolt 22 but is clamped rigidly between two nuts 25 and 26. The bolt 22 is at its ends attached to cover 1 by nuts 27 and 28 and to cover 2 by nuts 23 and 24. By unscrewing nut 26 a little and screwing-on nut 25, the carrier 13 is displaced to the right and vice-versa. In Figure 1 the counterbalancing bellows 12 is smaller than the two bellows 4 and 5; this however is not essential; it may be of equal size or even larger than the bellows 4 and 5. Furthermore there are associated with the bellows 12 an air supply 14 and an air escape 15 and a measuring duct 16 leading to a measuring instrument e. g. a manometer.

The air which may be admitted within this diaphragm 12 from an arbitrary source, exerts a counterbalancing force, directed oppositely to the above-mentioned directing force. The quantity of air to be admitted for producing the required counterbalancing force is controlled by a loose system of valves 17, provided within the said diaphragm 12, the valves of which are separately shown in Fig. 2; the dimensions of these two rigidly connected valves may be very small.

If just so much air is admitted that the directing force is counterbalanced, the pressure of air will show a linear relationship to the directing force.

The system of valves closing the admission and exhaust apertures 18 and 19 respectively, provided in the longitudinal axis of the counterbalancing chamber, is closed in the normal position. This is effected by the excess of pressure from the supply duct 14 on the admission valve 18, while moreover a small spring 20 pushes the valves to the left. This spring is enclosed by a locking screw 21.

If the directing force becomes larger than the counterbalancing force, the counterbalancing bellows will be pressed inwardly. The exhaust valve, namely in this drawing the left valve of the system 17, remains on its seat 19, but the admission valve is lifted from its seat over a small clearance. Immediately such quantity of air will enter until the bellows 12 returns to its original position and the admission aperture 18 will be closed again.

If on the other hand the directing force becomes smaller than the counterbalancing force the reverse phenomenon occurs. The admission valve remains on its seat 18 but the plate 6 together with the exhaust aperture 19 move over a small clearance from right to left, so that so much air will escape through the exhaust aperture 19, then set free, and through the air exhaust 15 until the equilibrium of the forces is restored again and the two apertures 18 and 19 are closed again by the system of valves 17.

To the measuring duct 16 there may be connected-up e. g. a manometer, which in this embodiment is directly calibrated to velocity of flow. For purifying the air an air filter may be introduced into the air admission duct 14, but this is not shown in this figure. It will be clear that the ratio between the directing force and the counterbalancing force remains constant very accurately, since substantially no mechanical friction occurs and moreover the bellows do not distort appreciably. Therefore no hysteresis phenomena will have to be feared.

The arrangement may still be made more accurate by providing one or more grooves of very small depth in one of the said valves e. g. in the admission valve or its seat and in such a way that the valve leaks very slightly. The reason therefor is as follows.

If both valves engage the seats and therefore are in their normal position, a very small increase of the directing force will have no influence upon the counterbalancing force, as long as the latter is not larger than the elastic force, exerted on the system of valves by means of the spring 20, increased by the resulting force of the pressures of air on the valves. The result might then be an inaccuracy of the measurement, which perhaps is allowable in many cases. This inaccuracy may however be eliminated completely by the groove, or grooves, through which a small quantity of air is always flowing, which has a tendency to increase the counterbalancing pressure. The increase of the counterbalancing pressure does not take place however, if the directing force does not increase, since the exhaust aperture is opened.

The system of valves 17 is ground in any suitable manner to fit on both valve seats. If a new system of valves is to be provided it will produce some difficulty in practice to make both the valve angle and the length of the valves exactly equal to the valves to be replaced. Since in accordance with the invention the zero point is adjustable, a slightly shorter or longer system of valves will not alter the operation of the apparatus. For this purpose the device 13 needs only to be displaced in the longitudinal direction of the apparatus, e. g., by means of an adjusting screw.

In the description given above it has been stated already that onto the rod 10 within the tube 8 there is applied a conical disc 11 having a sharp edge. In the embodiment shown in Fig. 1 the gap between the tube 8 and the disc 11 is constant.

The apparatus described may be advantageously applied in aeroplanes. The requirement that no ducts for motor spirit should lead through the fuselage of the aeroplane, can be satisfied fully since the apparatus may be installed somewhere in the duct to the carburetor at quite a distance from the cockpit and therefore a measuring duct (air duct) only leads to the dashboard.

In the construction explained above a flow meter was described as an embodiment. Of course the invention is not limited thereto. The tube 8, together with the diaphragm 5 and the members 7, 10, 9, 11 may be omitted, so that the directing force is exclusively effected by the pressure within the admission space and is not obtained as a difference of two pressures.

Amongst other applications of the invention may be mentioned spirit-height-indicator, indicator for high pressures, low pressures, excess or lack of pressure, pressure indicator for thick liquids, speed meter for boats, tachometer, altimeter, reducing valve, etc.

Although a specific embodiment of the invention has been shown and described, it is to be understood, of course, that modifications may be made therein without departing from the scope and spirit of this invention as defined in the appended claims.

What is claimed is:

1. Apparatus for counterbalancing a force or a pressure medium comprising a casing, a pair of diaphragms, means for admitting a pressure medium or a force to act on one of said diaphragms, means forming a conduit from one diaphragm to the other diaphragm, an enclosed chamber disposed between said diaphragms, one wall of said chamber being integral and movable with the first mentioned diaphragm, means for adjustably connecting another wall of said chamber to said casing adjacent to said other diaphragm, a pair of coaxially connected valves constituting an inlet valve and an outlet valve respectively freely mounted within said chamber, a seat for each of said valves, a spring normally closing said valves, means for admitting a counterbalancing medium to said chamber through the adjustably connected wall thereof, and means integral with the first-mentioned diaphragm for exhausting said medium or force, the arrangement being such that when a medium or force acts on the movable wall of said chamber, the displacement of the latter is counterbalanced in such a way that either the inlet valve is opened to admit the counterbalancing medium or the outlet valve is opened by the movable wall of said chamber until equilibrium is restored, the pressure or lack of pressure of said medium being a measure of the medium or force acting on said movable wall.

2. Apparatus according to claim 1, in which one of said valves or the seats thereof is provided with one or more grooves of very small depth to improve the sensitivity of the arrangement notwithstanding any interfering action of said spring.

HENDRIK A. HOEKSTRA.